(12) United States Patent
Kunz et al.

(10) Patent No.: US 11,822,494 B2
(45) Date of Patent: *Nov. 21, 2023

(54) NETWORK SWITCH WITH DMA CONTROLLER FOR INDEPENDENT DIRECT MEMORY ACCESS OF HOST SYSTEM

(71) Applicant: Marvell Asia Pte, Ltd., Singapore (SG)

(72) Inventors: Manfred Kunz, Rastatt (DE); Markus Althoff, Achern (DE); Xiongzhi Ning, Karlsruhe (DE)

(73) Assignee: Marvell Asia Pte, Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 17/861,645

(22) Filed: Jul. 11, 2022

(65) Prior Publication Data

US 2022/0342838 A1  Oct. 27, 2022

Related U.S. Application Data

(63) Continuation of application No. 16/697,361, filed on Nov. 27, 2019, now Pat. No. 11,386,027.

(Continued)

(51) Int. Cl.
*G06F 13/36* (2006.01)
*G06F 13/28* (2006.01)
(Continued)

(52) U.S. Cl.
CPC .......... *G06F 13/28* (2013.01); *G06F 9/30098* (2013.01); *G06F 9/4411* (2013.01); *G06F 9/544* (2013.01); *G06F 13/4022* (2013.01)

(58) Field of Classification Search
CPC .... G06F 13/28; G06F 9/30098; G06F 9/4411; G06F 9/544; G06F 13/4022
See application file for complete search history.

(56) References Cited

U.S. PATENT DOCUMENTS 6,055,583 A   4/2000  Robbins
8,122,177 B1  2/2012  Puranik
(Continued)

FOREIGN PATENT DOCUMENTS

JP   2004516698 A   6/2004
JP   2011070372 A   4/2011

OTHER PUBLICATIONS

Supplementary European Search Report issued in corresponding European Patent Application 19890208.2 dated Jul. 25, 2022.

(Continued)

*Primary Examiner* — Henry Tsai
*Assistant Examiner* — Kim T Huynh

(57) ABSTRACT

A network switch includes a data bus, a register, an endpoint controller and a direct memory access controller. The endpoint controller is configured to receive a descriptor generated by a device driver of a host system, store the descriptor in the register, and transfer data between a root complex controller of the host system and the data bus. The descriptor identifies an address of a buffer in a memory of the host system. The direct memory access controller is configured to receive the address of the buffer from the endpoint controller or the register and, based on the address and an indication generated by the device driver, independently control transfer of the data between the memory of the host system and a network device connected to the network switch. The direct memory access controller is a receive direct memory access controller or a transmit direct memory access controller.

24 Claims, 8 Drawing Sheets

Related U.S. Application Data

(60) Provisional application No. 62/772,506, filed on Nov. 28, 2018.

(51) Int. Cl.
  *G06F 13/40* (2006.01)
  *G06F 9/54* (2006.01)
  *G06F 9/4401* (2018.01)
  *G06F 9/30* (2018.01)

(56) References Cited

U.S. PATENT DOCUMENTS

| | | |
|---|---|---|
| 8,806,098 B1 | 8/2014 | Mandapuram et al. |
| 8,996,644 B2 | 3/2015 | Pope |
| 11,386,027 B2 * | 7/2022 | Kunz ............... G06F 13/28 |
| 2005/0027901 A1 | 2/2005 | Simon et al. |
| 2005/0157647 A1 | 7/2005 | Sterne et al. |
| 2007/0130403 A1 | 6/2007 | Bauer et al. |
| 2007/0165663 A1 | 7/2007 | Aloni et al. |
| 2008/0077310 A1 | 3/2008 | Murlidar et al. |
| 2009/0304002 A1 | 12/2009 | Yu et al. |
| 2013/0051398 A1 | 2/2013 | Hidaka |
| 2013/0111077 A1 | 5/2013 | Gowravaram et al. |
| 2015/0278134 A1 | 10/2015 | Conroy et al. |
| 2016/0127494 A1 | 5/2016 | Liu et al. |
| 2016/0210167 A1 | 7/2016 | Bolic et al. |
| 2016/0342547 A1 * | 11/2016 | Liss ............... G06F 13/4282 |
| 2017/0097910 A1 * | 4/2017 | Kumar A V ......... G06F 13/404 |
| 2017/0180273 A1 | 6/2017 | Daly et al. |
| 2020/0167300 A1 * | 5/2020 | Kunz ............... G06F 9/544 |

OTHER PUBLICATIONS

Altera Corporation, "V-Series Avalon-MM DMA Interface for PCIe Solutions User Guide;" Oct. 31, 2016.
International Search Report and Written Opinion dated Feb. 10, 2020 in corresponding PCT application matter PCT/US2019/063626.
U.S. Appl. No. 16/697,361, filed Nov. 27, 2019.
U.S. Appl. No. 16/697,361, filed Nov. 27, 2019, Kunz et al.
Office Action issued in corresponding Japanese Patent Application 2021-530242 dated Sep. 5, 2023.

* cited by examiner

NETWORK SWITCH WITH DMA CONTROLLER FOR INDEPENDENT DIRECT MEMORY ACCESS OF HOST SYSTEM

CROSS-REFERENCE TO RELATED APPLICATIONS

This application is a continuation of U.S. patent application Ser. No. 16/697,361 filed on Jul. 12, 2022, and claims the benefit of U.S. Provisional Application No. 62/772,506, filed on Nov. 28, 2018. The entire disclosures of the applications referenced above are incorporated herein by reference.

FIELD

The present disclosure relates to transfer of data between devices within a vehicle, and more specifically to automotive Ethernet switch devices for transferring sensor data to host controllers within the vehicle.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Automotive applications, such as autonomous vehicles, have ever increasing demand for high bandwidth of data traffic. The autonomous vehicles include fully and partially autonomous vehicles. This includes transfer of video, audio, LIDAR, RADAR, proximity and/or other sensor data. As an example, sensors within a vehicle can be configured to monitor an environment exterior to a vehicle and provide data back to a host system for processing. The data is processed by the host system and is used to perform actions within the vehicle (e.g., autonomous operations, such as braking, steering, accelerating, etc.). The data can also or alternatively be routed to network devices and/or components internal and/or external to the vehicle.

SUMMARY

A network switch is provided and includes a data bus, a register, an endpoint controller and a direct memory access controller. The endpoint controller is configured to receive a descriptor generated by a device driver of a host system, store the descriptor in the register, and transfer data between a root complex controller of the host system and the data bus. The descriptor identifies an address of a buffer in a memory of the host system. The direct memory access controller is configured to receive the address of the buffer from the endpoint controller or the register and, based on the address and an indication generated by the device driver, independently control transfer of the data between the memory of the host system and a network device connected to the network switch. The direct memory access controller is a receive direct memory access controller or a transmit direct memory access controller.

In other features, the endpoint controller is a peripheral component interconnect express device transferring the data according to a peripheral component interconnect express protocol. In other features, the indication is a flag stored in the memory, an interrupt, or a signal.

In other features, the network switch of claim 1, further includes: a medium access control device configured to transfer the data to or from the direct memory access controller; and an Ethernet switch configured to transfer the data between the medium access control device and the network device connected to the network switch. In other features, the network device is a sensor, an actuator, a peripheral component interconnect express device, or an endpoint device.

In other features, the network switch further includes a medium access control device, wherein, while independently controlling transfer of the data, the direct memory access controller is configured to transfer the data between the data bus and the medium access control device without interaction with a host controller of the host system.

In other features, the direct memory access controller is configured to obtain control of the buffer of the memory from the device driver prior to transfer of the data and, after transferring the data, generate an interrupt to return control of the buffer to the device driver.

In other features, the network switch further includes another controller configured to, receive a rule stored in the memory and, based on the rule, inspect a frame received from the network device at the network switch and either drop the frame, forward the frame to the device driver, an application controller of the host system or a denial of service controller of the host system.

In other features, a data transfer system is provided and includes: the network switch of claim 1; the memory; a host controller implementing the device driver; and the root complex controller configured to provide the host controller and the direct memory access controller access to the memory.

In other features, the device driver is configured to transfer control of the buffer to the direct memory access controller and the direct memory access controller is configured to return control of the buffer back to the device driver. In other features, the root complex controller is configured to control transfer of control information between the device driver and the memory. In other features, the root complex controller and the endpoint controller are peripheral component interconnect express devices operating according to a peripheral component interconnect express protocol.

In other features, the data transfer system further includes a denial of service controller configured to receive a frame from the network switch, determine whether the frame is likely associated with an attack, change a rule stored in the memory and send the changed rule to the network switch to drop another frame or a connection with the network device.

In other features, a method of operating network switch is provided and includes: receiving at an endpoint controller of the network switch a descriptor generated by a device driver of a host system, where the descriptor identifies an address of a buffer in a memory of the host system; storing the descriptor in a register; transferring data between a root complex controller of the host system and a data bus of the network switch; receiving at a direct memory access controller the address of the buffer from the endpoint controller or the register; and based on the address and an indication generated by the device driver, independently controlling transfer of the data between the memory of the host system and a network device connected to the network switch.

In other features, the method further includes transferring the data according to a peripheral component interconnect express protocol via the endpoint controller. In other features, the method further includes: transferring the data to or from the direct memory access controller via a medium access control device; and transferring the data between the medium access control device and the network device connected to the network switch via an Ethernet switch.

In other features, the method further includes, while independently controlling transfer of the data, transferring via the direct memory access controller the data between the data bus and a medium access control device without interaction with a host controller of the host system.

In other features, the method further includes: obtaining at the direct memory access controller control of the buffer of the memory from the device driver prior to transfer of the data; and after transferring the data, generating an interrupt to return control of the buffer to the device driver.

In other features, the method further includes: receiving a rule stored in the memory; and based on the rule, inspecting a frame received from the network device at the network switch and either drop the frame, forward the frame to the device driver, an application controller of the host system or a denial of service controller of the host system.

In other features, the method further includes: receiving a frame from the network switch; determining whether the frame is likely associated with an attack; changing a rule stored in the memory; and sending the changed rule to the network switch to drop another frame or a connection with the network device.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

Figure 1:
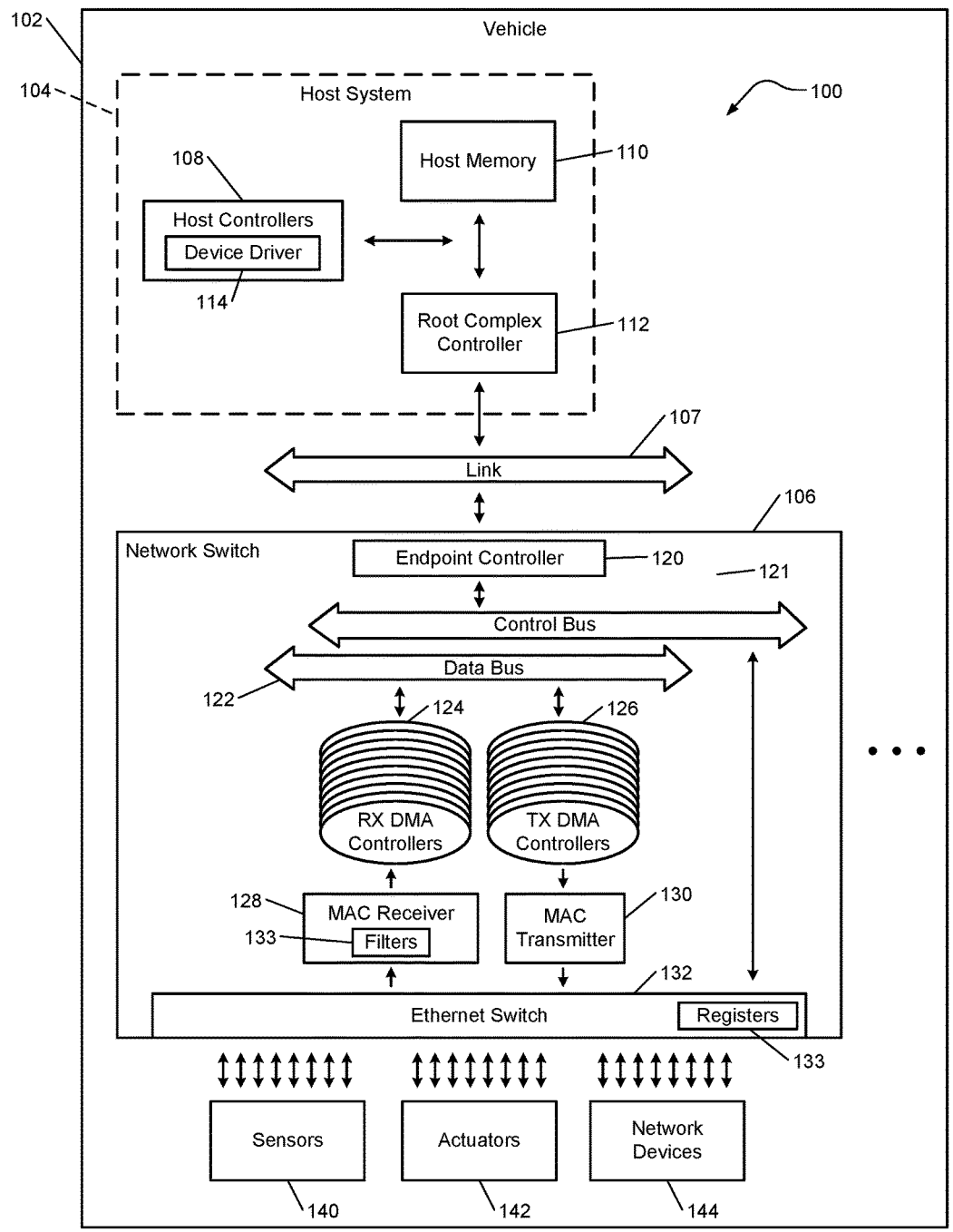
FIG. 1 is a functional block diagram of a data transfer system of a vehicle including a host system and one or more network switches in accordance with the present disclosure.

A vehicle can include numerous sensors for monitoring states of vehicle components and interior and exterior environments of the vehicle. A host system of the vehicle can also include multiple controllers that receive the data from the sensors and, in response, to the received sensor data, perform various operations. In certain applications, the data is shared with nearby vehicles, remote stations and/or network devices within the vehicle. Some example controllers are an engine controller, a transmission controller, a heating, ventilation and air conditioning (HVAC) controller, a partially or fully autonomous vehicle controller, an infotainment controller, a lighting controller, etc.

The examples set forth herein include a data transfer system including a host system and one or more network switches for routing data between the host system and other network devices within and/or external to a vehicle. In various embodiments, each of the network switches is configured as an endpoint device and includes an endpoint controller for communicating with a root complex controller of the host system. As a result, each of the network switches is seen as a single endpoint device (e.g., peripheral component interconnect express (PCIe) endpoint) to the host system. As such, each of the network switches appears as a single device, which is able to be controlled by the host system using, for example PCIe protocols and a PCIe link.

The network switches further include direct memory access (DMA) controllers, which control transfer of data between registers in the network switches and buffers in host memory of the host system. One or more device drivers of the host system follow an initialization procedure including preconfiguring a host memory and the network switches to allow access to the host memory by the network switches. This includes pre-allocating buffers and descriptors of the host memory. Some of the descriptors are pre-configured during the initialization procedure. Once the initialization procedure is completed, the one or more device drivers provide access control of the host memory to the network switches. The network switches are then able to control by pre-allocating buffers and pre-configuring the descriptors the transfer of data to and from the host memory independent of the host controllers. The endpoint controllers allow the one or more device drivers to control internal operations of the network switches including operations of the DMA controllers, medium access control (MAC) receivers and transmitters, and/or a ternary content addressable memory (TCAM) controller.

In one example, the root complex and endpoint controllers are PCIe devices that communicate over a PCIe link, which is a point to point connection. A PCIe link between the root complex controller and an endpoint controller includes 2 lanes running at PCIe third generation (GEN 3) and is capable of collectively transmitting up to 5-10 giga-bytes per second (Gbps), from a single Ethernet port.

The network switches include smart features, such as Internet protocol (IP) routing and attack prevention. In one embodiment, each of the network switches includes a TCAM controller, which implements the IP routing and attack prevention. In another embodiment, one or more of the device drivers of the host system and the TCAM controller collaborate to provide attack prevention. The host system includes denial of service (DoS) firmware and the TCAM controller includes IP routing firmware. The IP routing firmware determines source and destination addresses of ports, queues, registers, host buffers, DMA engines, etc. for each frame and routes the frames accordingly. The DoS firmware monitors incoming frames and based on predetermined rules determines whether to permit routing of a frame as directed by the IP routing firmware, reroute the frame for further analysis, and/or drop the frame.

The ports, queues, register, and DMA engine are located within a particular one of the network switches. In one example, the IP routing and attack prevention firmware is dynamically configured and/or controlled by the one or more device drivers and/or host controllers of the host system.

FIG. 1 shows a data transfer system 100 of a vehicle 102 for transferring data (e.g., sensor data) between host controllers and network devices (e.g., sensors and other network devices). The data transfer system 100 includes a host system 104 and one or more network switches (one network switch 106 is shown), which communicate with each other via a link 107, such as a PCIe link. The host system 104 includes one or more host controllers 108, host memory 110, and a root complex controller 112. The host controllers 108 include a device driver 114, which is implemented at one of the host controllers 108. As an example, the host controllers 108 are implemented as central processors and control operations of the vehicle 102 in response to sensor data and/or other received data. The device driver 114 configures the host memory 110 and the network switch 106 for transfer of data between the network switch 106 and the host memory 110 independent of the host controllers 108. The host memory 110 may include solid-state memory and/or other memory for storing the received data and/or data to be transmitted to network devices downstream from the network switch 106, such as vehicle status data. The root complex controller 112 controls transfer of data and control information (i) between the host controllers 108 and the host memory 110, (ii) between the host controllers 108 and the network switch 106, and (iii) between the host memory 110 and the network switch 106.

Each of the network switches includes an endpoint controller 120, a control bus 121, a data bus 122, receive (RX) DMA controllers 124, transmit (TX) DMA controllers 126, a MAC receiver 128, MAC transceiver 130, and an Ethernet switch 132. The endpoint controller 120 controls transfer of data and control information to and from the root complex controller 112 via the link 107 and to and from the DMA controllers 124, 126 via the buses 121, 122. The control bus 121 is connected to registers 133. Control information is stored in the registers 133 and is applied prior to transferring data. The registers 133 are implemented in the Ethernet switch 132. The endpoint controller 120 allows the network switch 106 to operate as an endpoint device relative to the host system 104 by, for example, communicating over a PCIe link as a PCIe endpoint device, which supports full-duplex communication between the host system 104 and the network switch 106 and control of the entire network switch 106.

In an embodiment, the root complex controller 112, the link 107 and the endpoint controller 120 are implemented as PCIe components of a PCIe system that operate according to PCIe protocols. The root complex controller 112 is implemented as a PCIe root complex that connects the host controllers 108 and host memory 110 to a PCIe switch fabric of the network switches. In an embodiment, the link 107 is implemented as a PCIe link. The endpoint controller 120 is implemented as a PCIe endpoint.

The control bus is 121 is used for transferring control information including descriptor information. If a descriptor is ready in the host system 104, then the device driver 114 triggers the network switch 106 over the control bus. The network switch 106 then starts one of the DMA controllers 124, 126 to get the descriptor and corresponding application data. Examples of descriptor information include source and destination addresses, source and destination identifiers (IDs), and frame sizes and types. The data bus 122 is used for transferring data to and from the host memory 110. The DMA controllers 124, 126 control transfer of data to and from the host memory 110 based on descriptor information received from the device driver 114. The network switch 106 includes any suitable number of RX DMA controllers 124 and any suitable number of TX DMA controllers 126. In the example shown, the network switch 106 includes ten receive DMA controllers 124 and ten transmit DMA controllers 126. By having multiple DMA controllers 124, 126 controlling transfer of data, high bandwidth is achieved between the host system 104 and the network switch 106 via the link 107, which in an embodiment, provides one or more PCIe links. Data received in the host memory 110 and provided by the network switch 106 via the receive DMA controllers 124 is processed by the host controllers 108. Resultant processed data can then be sent to the network switch 106 using the transmit DMA controllers 126. These transfers of data include multi-layer transferring, processing and switching of data within the host system 104, for example, between application, presentation, session, transport and network layers of the host system 104.

The MAC receiver 128 provides control abstraction of a physical layer such that the complexities of physical link control are invisible to logic link control and upper layers of the corresponding network stack. The physical layer is implemented at least partially by the Ethernet switch 132. The MAC receiver 128 converts received frames to frames for passage to the RX DMA controllers 124. This conversion, in some applications, includes removal of a synchronization word preamble, padding and/or a frame check sequence from received frames. The MAC receiver 128 includes filters 133 that distribute incoming frames to the receive DMA controllers 124. The MAC transmitter 130 converts frames in an appropriate format for transmission in the physical layer. This conversion, in some applications, includes adding a synchronization word preamble, padding and a frame check sequence to identify transmission errors.

The Ethernet switch 132 controls transfer of data between (i) the MAC receiver 128 and the MAC transmitter 130 and (ii) sensors 140, actuators 142, and other network devices 144. Examples of the sensors 140 include one or more RADAR sensors, LIDAR sensors, proximity sensors, cameras, temperature sensors, pressure sensors, voltage sensors, current sensors, flow rate sensors and the like. Examples of the actuators 142 include an engine, motors, pumps, and valves. Examples of the other network devices 144 include a transceiver, a telematics controller, an infotainment controller, a global positioning system (GPS) controller, a navigation controller, a lighting controller, a brake controller, a steering controller, an accelerating controller, etc.

The network switch 106 is structured differently and operates differently than a typical network interface card (NIC) and a traditional PCIe switch and, by virtue of its innovative architecture and functionalities, provides flexibility and adaptability for different applications implemented by the host controllers 108. A NIC provides an interface between a host system and a network via a single Ethernet port. For example, a NIC may be used as an interface between a PCIe link, which is connected to a PCIe root complex, and a local area network (LAN). A traditional PCIe switch is not a PCIe endpoint device, but rather is used to switch frames between a PCIe link and multiple PCIe endpoint devices. The network switch 106 is able to transfer and convert frames similar to a NIC and in addition includes the integrated endpoint controller 120, which allows the network switch 106 to be seen as an endpoint device by the host controllers 108. The network switch 106, in certain implementations, is connected to one or more PCIe endpoint devices. Being a component that is integrated into network switch 106, the endpoint controller 120 allows the device driver 114 to configure and have full access to elements of the network switch 106 including the DMA controllers 124, 126, MAC receiver 128, MAC transmitter 130 and the Ethernet switch 132. The device driver 114 is able to configure the host system 104 and the network switch 106 to bind certain traffic of the DMA controllers 124, 126 to one of the host controllers 108. This allows distributing receive and transmit load to multiple host controllers. In an embodiment, the network switch 106 is configured to support transmission control protocol communication between network devices.

Figure 2:
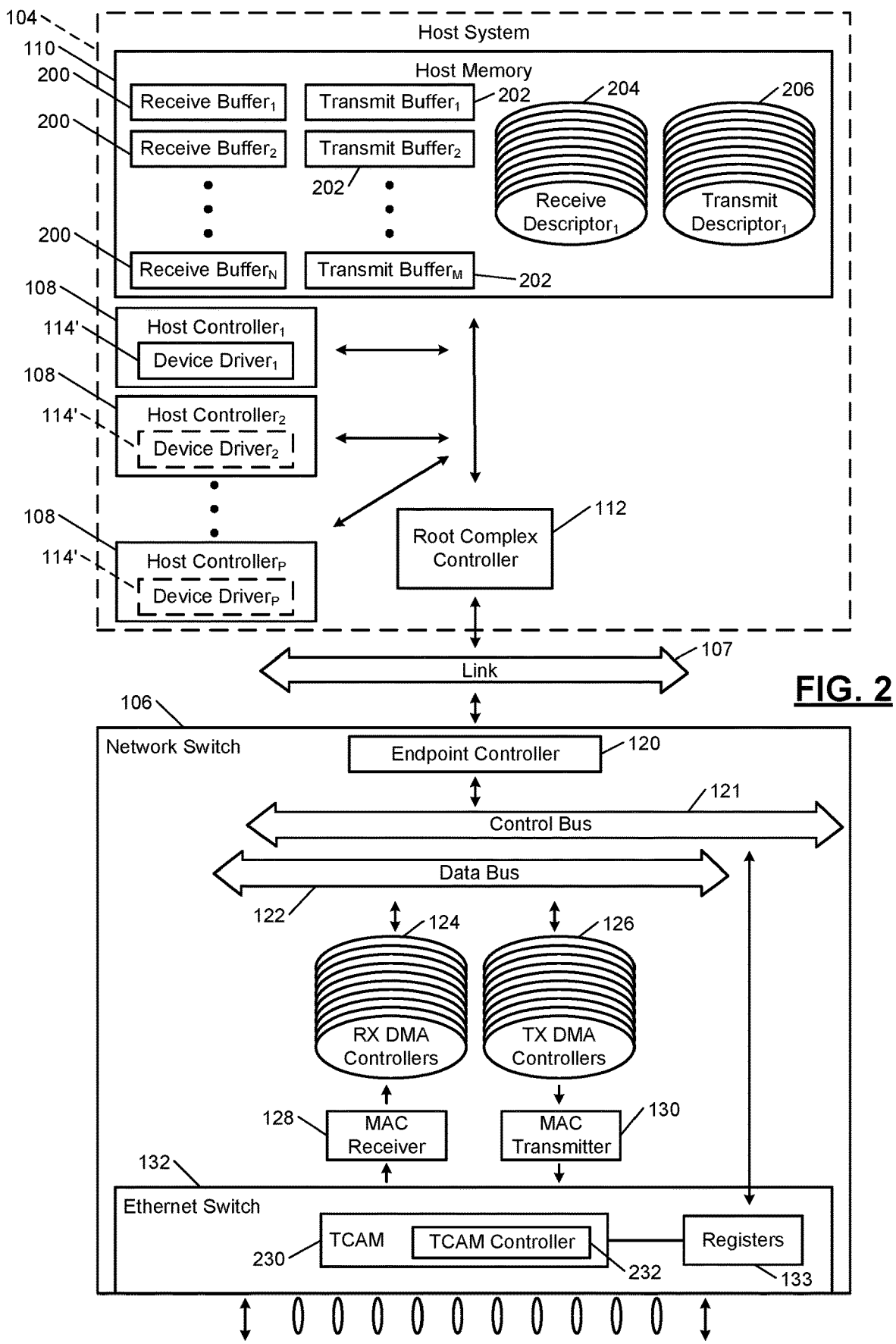
FIG. 2 is a functional block diagram of the host system and one of the network switches of FIG. 1.

FIG. 2 shows in greater detail the host system 104 and the network switch 106, which transfer data and control information over the link 107. The host system 104 includes the host controllers 108, the host memory 110 and the root complex controller 112. In one embodiment, only a single device driver is included. In another embodiment, two or more of the host controllers 108 include respective device drivers. Each of the device drivers (designated 114') may be configured and/or operate similarly.

The host memory 110 includes receive buffers 200, transmit buffers 202, receive descriptors 204 and transmit descriptors 206. The receive buffers 200 receive data from the network switch 106. The transmit buffers 202 store data, which is transmitted from the network switch via the Ethernet switch to actuators 142 and/or network devices 144 of FIG. 1. The receive descriptors 204 store control information pertaining to the data stored in the receive buffers 200. The transmit descriptors 206 store control information pertaining to the data stored in the transmit buffers 202. The control information in the descriptors 204, 206 include source and destination addresses, source and destination IDs, types of frames stored, and sizes of the frames stored. In an embodiment, each of the descriptors 204, 206 identifies one of the host controllers 108, one of the DMA controllers, one of registers 133 of the Ethernet switch 132, a port of the Ethernet switch 132, and an ID of one of the sensors 140, actuators 142 and network devices 144.

The network switch 106 includes the endpoint controller 120, the control bus 121, the data bus 122, the RX DMA controllers 124, the TX DMA controllers 126, the MAC receiver 128, the MAC transmitter 130, and the Ethernet switch 132. The control bus 121 is connected to the registers 133. Control information is stored in the registers 133 and is applied prior to transferring data. Received data may be stored in memory of the Ethernet switch 132, such as in TCAM 230, prior to being sent to the host memory 110 or the devices external to and connected to the Ethernet switch 132, such as the sensors 140, the actuators 142 and the network devices 144. The descriptors 204, 206 may be associated with the registers 133 and/or other buffer/memory in the network switch 106. Register access is initiated by the device driver 114 and less bandwidth is required. Receive DMA controllers 124 get receive descriptors similar to when getting receive data from the receive buffers 200. Transmit DMA controllers 126 get transmit descriptors similar to when getting transmit data from the transmit buffers 202. A significant amount of bandwidth is associated with these tasks, which are initiated by the network switch 106.

The root complex controller 112 provides an ability to map the registers 133 to an address space of the host memory 110. This enables the device driver 114' to initialize and maintain the MAC receiver 128, the MAC transmitter, and the DMA controllers 124, 126 via memory mapped register access. The DMA controllers 124, 126 interoperate with the device driver 114' using the descriptors 204, 206. This includes sharing information stored as part of the descriptors 204, 206.

The root complex controller 112 and the endpoint controller 120 provide a management interface that provides access to elements of the network switch 106 dynamically during runtime. When the root complex controller 112 and the endpoint controller 120 are implemented as PCIe devices, the network switch 106 appears as a PCIe Ethernet device to the host system. The device drivers 114' have full access to the DMA controllers 124, 126, the MAC receiver 128, MAC transmitter 130, the registers 133, and TCAM controller 232 of the TCAM 230.

The Ethernet switch 132 includes the registers 133, the TCAM 230 and the TCAM controller 232, in an embodiment. The TCAM controller 232 controls transfer of frames, based on control information in the registers 133 and TCAM rules (e.g., TCAM rules 604 of FIG. 6), between (i) the devices external to and connected to the Ethernet switch 132 and (ii) the MAC receiver 128 and the MAC transmitter 130. In an embodiment, the Ethernet switch 132 transmits and/or receives data at up to 5-10 Gbps, in an embodiment.

Figure 3:
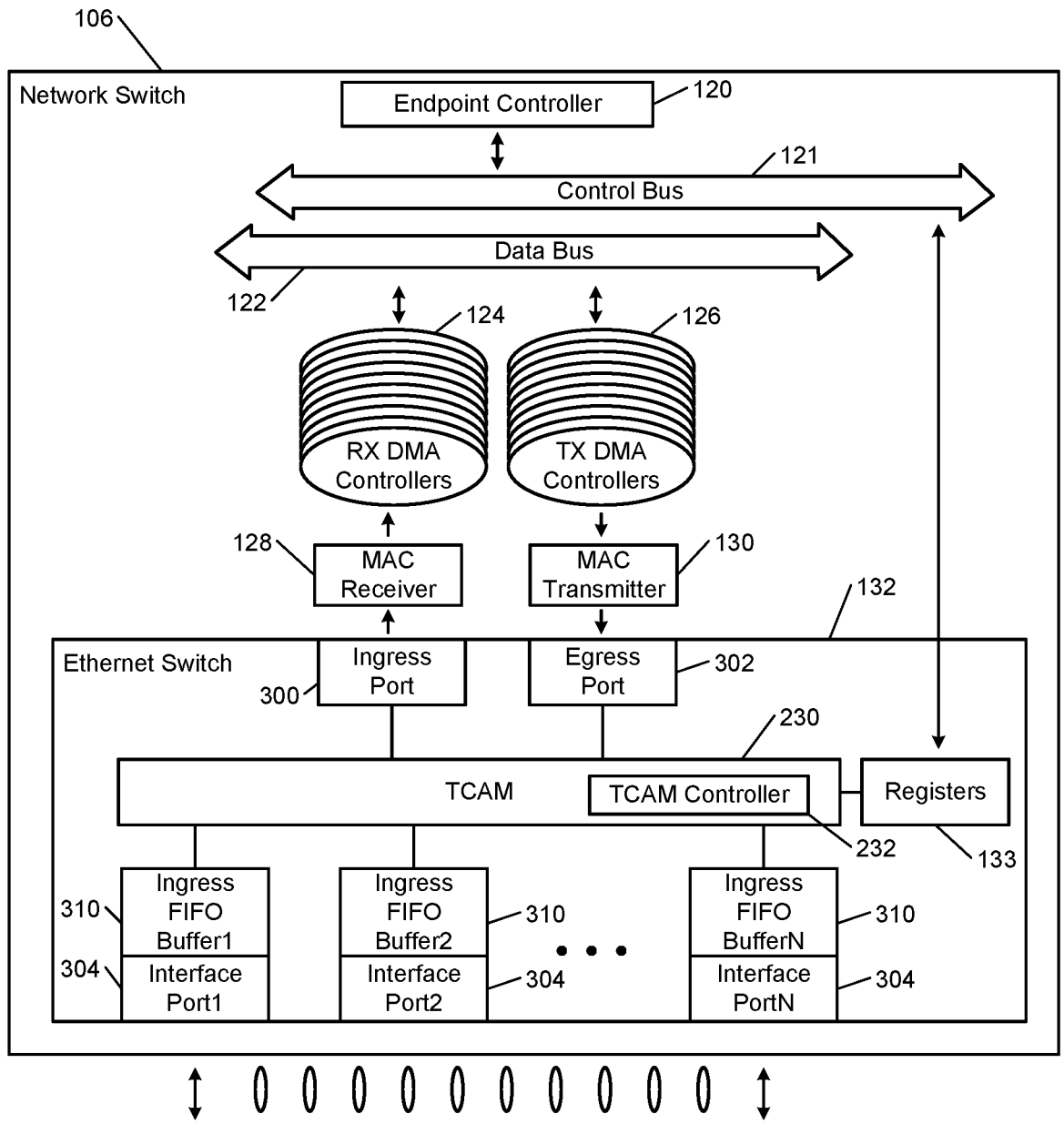
FIG. 3 is a functional block diagram of the network switch of FIG. 2.

FIG. 3 shows the network switch 106, which includes the endpoint controller 120, the control bus 121, the data bus 122, the RX DMA controllers 124, the TX DMA controllers 126, the MAC receiver 128, the MAC transmitter 130, the Ethernet switch 132, and the registers 133. The Ethernet switch 132 includes the registers 133, the TCAM 230, the TCAM controller 232, an ingress port 300, an egress port 302, interface ports 304, and ingress first-in-first-out (FIFO) buffers 310.

Figure 5:
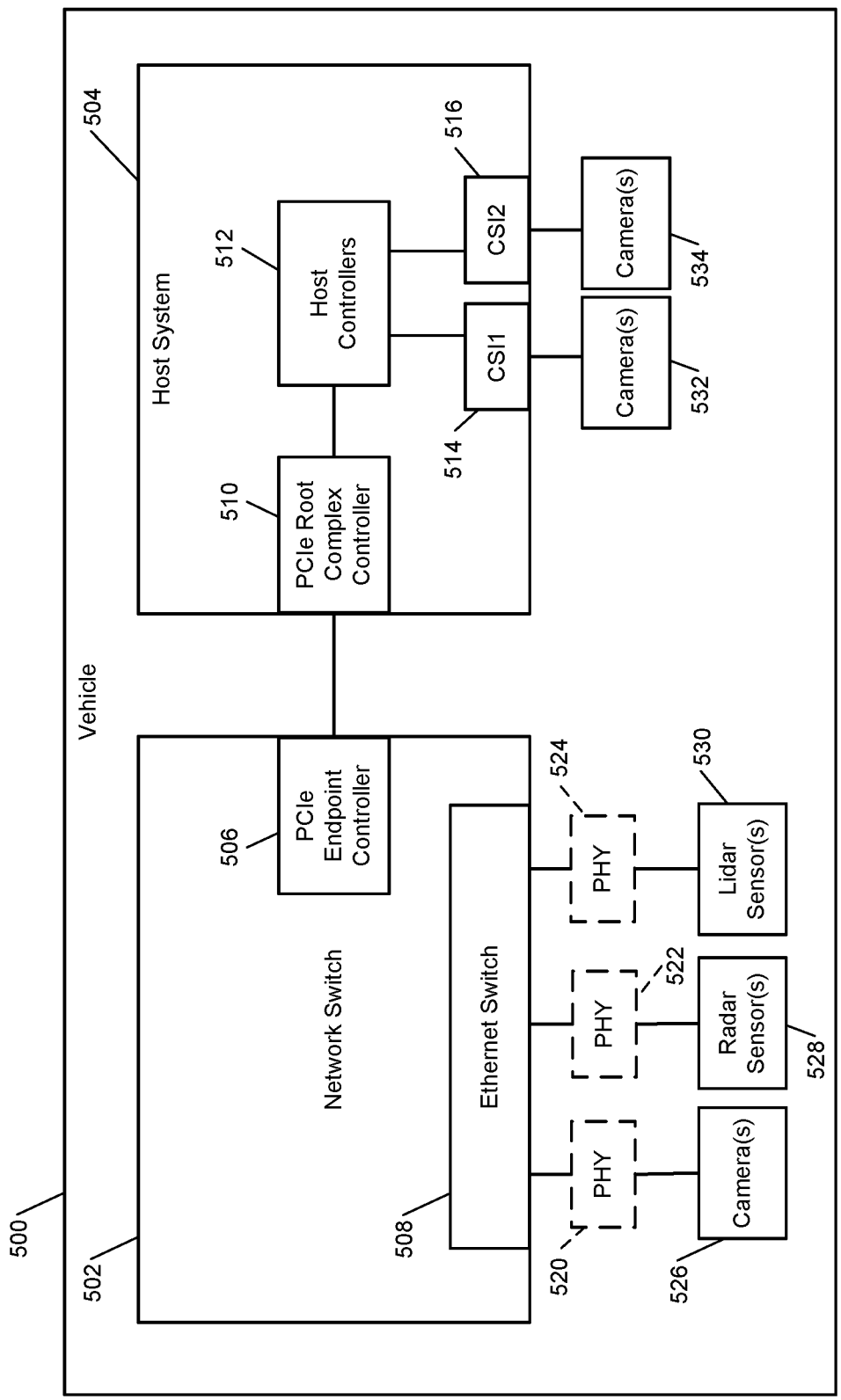
FIG. 5 is a functional block diagram of an example partially or fully autonomous vehicle implementation of a network switch and a host system in accordance with the present disclosure.

The TCAM controller 232, based on control information in the registers 133, controls transfer of frames between (i) the ports 300 and 302 and (ii) the interface ports 304. In an embodiment, the TCAM controller 232 is directly connected to the registers 133 or accesses the registers via the control bus 121. The TCAM controller 232 accesses control information stored in the registers 133. The ports 304 are connected to the devices external to and connected to the Ethernet switch 132. In an embodiment, the ports 300, 302 are unidirectional ports, some of the ports 304 are unidirectional and other ones of the ports 304 are bidirectional. The unidirectional ports are used for transferring sensor data from sensors to the host system 104. The bidirectional ports are used for bidirectional transfer of data and control information between, for example, the host system 104, including the host controllers 108 and the host memory 110, and network devices downstream from the Ethernet switch 132. The buffers 310 are sized to hold bytes to be compared to check to see if received data paces TCAM rules (e.g., TCAM rules 604 of FIG. 6). Frames are scanned and filtered as the frames are received from device external to the network switch. The buffers 310 are enabled when a TCAM rule is assigned to the corresponding port of the Ethernet switch 132. The frames are checked as the frames are received rather than checking the frames after the frames are received. By checking the frames as the frames are received, processing time associated with checking the frames is minimized. In an embodiment, the interface ports 304 are implemented as physical layer (PHY) circuits. In another embodiment, the interface ports 304 are connected to PHY circuits, which are external to the Ethernet switch 132. The PHY circuits are connected to the devices 140, 142, 144. In another embodiment, some of the interface ports 304 are implemented as serial interfaces and connected to respective sensors. Example PHY circuits are shown in FIG. 5. In an example embodiment, some of the interface ports 304 are serializer/deserializer (SERDES) interfaces and reduced gigabit media independent interfaces (RGMIIs).

Figure 4:
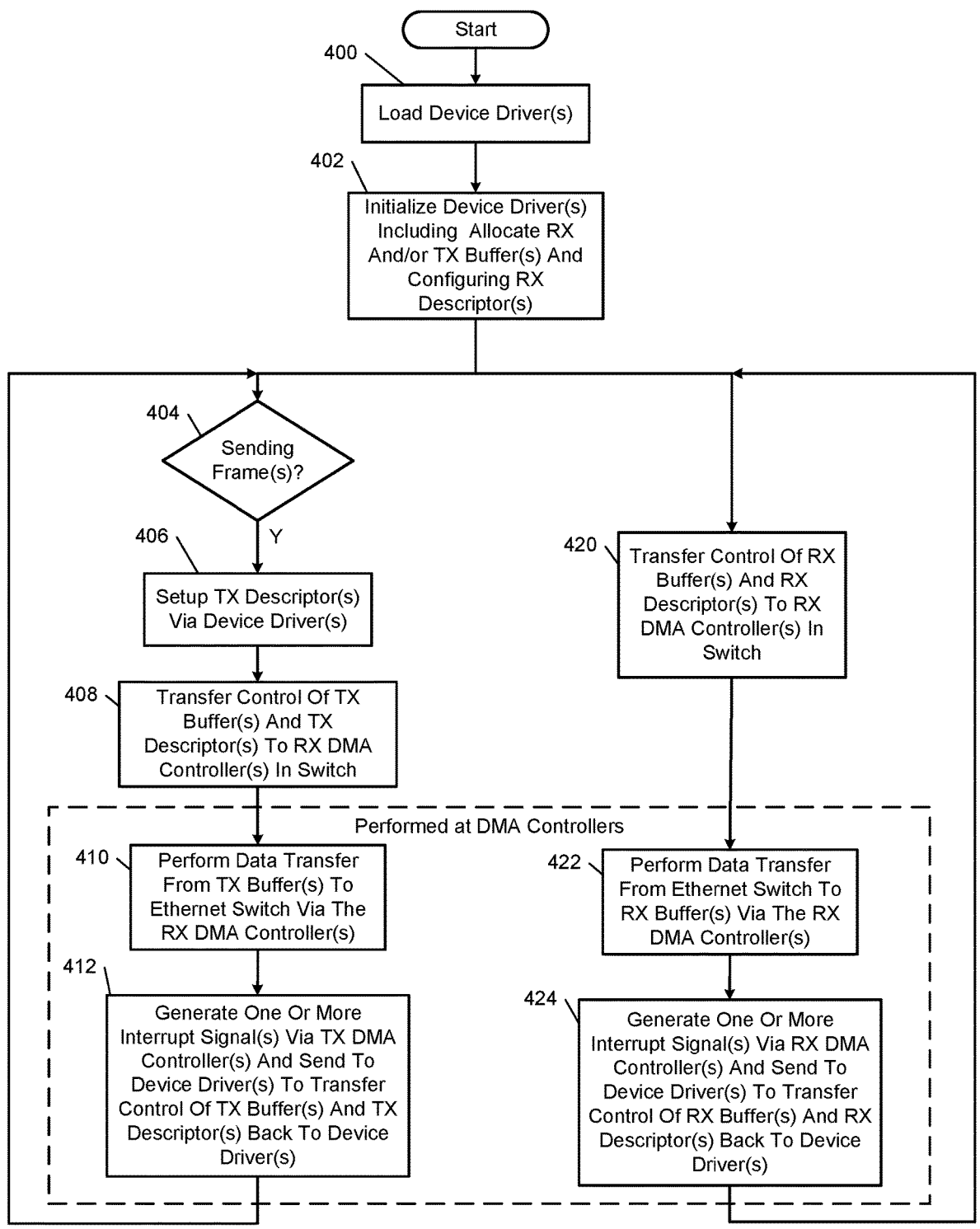
FIG. 4 illustrates a data transfer method in accordance with the present disclosure.

FIG. 4 shows a data transfer method. Although the following operations are primarily described with respect to the implementations of FIGS. 1-3, the operations may be easily modified to apply to other implementations of the present disclosure. The operations may be iteratively performed. Although the following operations are primarily described in association with use of a single device driver, the operations may be modified and implemented in association with multiple device drivers.

At 400, one of the host controllers 108 loads the device driver 114 from, for example, the host memory 110 and executes the device driver 114. In one embodiment, the device driver 114 is an Ethernet device driver.

At 402, the device driver 114 allocates the buffers 200, 202 to the DMA controllers 124, 126, and configures the receive descriptors 204 while leaving the transmit descriptor 206 empty. A receive descriptor is pre-classified and configured for each receive buffer and allocated to one of the host controller 108, which in an embodiment is changed using an interrupt generated by the device driver 114. Each of the DMA controllers 124, 126 is allocated to one or more of the buffers 200, 202. The receive buffers 200 are allocated to the receive DMA controllers 124 and the transmit buffers 202 are allocated to the transmit DMA controllers 126. In an embodiment, the buffers 200, 202 are shared by the DMA controllers 124, 126. Two or more of the receive buffers 200 are shared by two or more of the receive DMA controllers 124. Similarly, two or more of the transmit buffers 202 are shared by two or more of the transmit DMA controllers 126. The receive descriptors 204 are generated and configured as described above to include source and destination addresses, source and destination IDs, and/or other control information that is available when configured. The source and destination addresses include addresses of the receive buffers 200, the receive DMA controllers 124, registers 133, ports of the Ethernet switch 132, and/or ultimate destined devices external to the switch 106. The source and destination IDs include identifiers of the receive buffers 200, the receive DMA controllers 124, the registers 133, ultimate destined devices external to the switch 106, ports of the Ethernet switch 132, and/or intermediary devices such as the root complex controller 112 and the endpoint controller 120.

In an embodiment, although described below as being setup after determining that data is to be transmitted, the transmit descriptors 206 are setup at least partially in advance. The device driver 114 allocates the one or more of the transmit descriptors 206 to one or more of the transmit DMA controllers 126. The device driver 114 generates the transmit descriptors 206 to include addresses and IDs of the transmit buffers 202 and/or the transmit DMA controllers 126. At this point, the transmit descriptors 206 do not include the addresses and/or IDs of ultimate destined devices. The transmit descriptors remain empty if no control information is available.

The following operations 406, 408, 410, 412 are performed when frames are transmitted. Operations 420, 422, 424 are performed when frames are received. The host system 104 and the network switch 106 perform operations 420, 422, 424 while operations 406, 408, 410, 412 are performed.

At 404, the device driver 114 determines whether frames are to be transmitted. As an example, one of the host controllers 108 generates an interrupt, sets a flag in memory, or signals the device driver 114 that frames are to be transmitted. In an embodiment, an interrupt is generated by the network switch 106, which signals the device driver 114 that frames are to be transferred. This may similarly occur when a receive or transmit transfer of frames is completed. As another example, this may occur when descriptors 204, 206 are re-filled (i.e. new and/or updated control information is stored as the descriptors). If the device driver 114 is controlling operation of one or more of the host controllers 108, then the device driver 114 knows when frames are to be transmitted. At 406, the device driver 114 configures the transmit descriptors 206. This includes generating the transmit descriptors 206 and storing the transmit descriptors 206 in the host memory 110 if not already done. The transmit descriptors 206 are allocated to corresponding ones of the host controllers 108, which in an embodiment are changed using interrupts generated by the device driver 114. The transmit descriptors 206 are configured to include addresses and/or IDs destined devices to which corresponding frames are to be sent.

At 408, the device driver 114 transfers control of transmit buffers 202 and transmit descriptors 206 to the transmit DMA controllers 126. This includes the device driver 114 at least one of signaling the transmit DMA controllers 126 indicating control is transferred, setting a control flag in the host memory 110 and/or in the registers 133 that is accessible and monitored by the transmit DMA controllers 126, or generating an interrupt detected by the transmit DMA controllers 126. The following operations 410, 412 are performed independent of the host controllers 108 and/or software interaction implemented in the host system 104 by the host controllers 108 and as a result central processing cycles of the host controllers 108 are not used to perform these operations. At 410, the transmit DMA controllers 126 control transmission of frames. This includes signaling the endpoint controller 120 to instruct the root complex controller 112 to access data stored in the transmit buffers 202 according to control information in corresponding ones of the transmit descriptors 206. The transmit DMA controllers 126 access the data stored in the transmit buffers 202 and transmit the data via the Ethernet switch 132 to devices external to the network switch 106.

Some of the control information and status information is stored in the registers 133. The status information includes whether data is being received or transmitted and whether the transfer is to be performed, is currently being performed or is completed. The control and status information is accessed by the DMA controllers 124, 126 through the control bus 121. The endpoint controller 133 operates as a pass through device for data transfer to and from the DMA controllers 124, 126. Receive data is stored in receive DMA controllers 124 before being sent to the host system 104 and transmit data is stored in transmit DMA controllers 126 before being sent out via external port of the Ethernet switch 132. The DMA controllers 124, 126 include buffers and/or memory for temporarily storing the data. The buffers and/or memory of the DMA controllers 124, 126 are able to store significantly more data than the registers 133. This allows the DMA controllers 124, 126 to store the data being transferred and the corresponding descriptors. Transfer of the data and descriptors is accomplished via the data bus 122.

At 412, the transmit DMA controllers 126 generate one or more interrupts indicating that control is transferred to the device driver 114. Control of the transmit buffers 202 and transmit descriptors 206 is as a result returned to the device driver 114.

At 420, the device driver 114 transfers control of the receive buffers 200 and the receive descriptors 204 to the receive DMA controllers 124. This includes at least one of signaling the receive DMA controllers 124 indicating control is transferred, setting a control flag in the host memory 110 and/or in the registers 133 that is accessible and monitored by the receive DMA controllers 124, or generating an interrupt detected by the receive DMA controllers 124.

The following operations 422, 424 are performed independent of the host controllers 108 and/or software interaction implemented in the host system 104 by the host controllers 108 and as a result central processing cycles of the host controllers 108 are not used to perform these operations. At 422, the receive DMA controllers 124 control transmission of frames. This includes receiving and/or accessing data from the Ethernet switch 132 and storing the data in the receive buffers 200. The receive DMA controllers 124 signal the endpoint controller 120 to instruct transfer data to the receive buffers 200, which in turn instructs the root complex controller 112 to store the data in the receive buffers 200. These operations are performed according to control information in corresponding ones of the receive descriptors 204.

At 424, the receive DMA controllers 124 generate one or more interrupts indicating that control is transferred to the device driver 114. Control of the receive buffers 200 and receive descriptors 204 is as a result returned to the device driver 114.

FIG. 5 shows an example partially or fully autonomous vehicle 500 implementation of a network switch 502 and a host system 504. The network switch 502 and the host system 504 are implemented similarly as the network switches and host systems described above including the examples shown in FIGS. 1-3. The network switch 502 includes a PCIe endpoint controller 506 and an Ethernet switch 508. The host system 504 includes a PCIe root complex controller 510, host controllers 512, and media interfaces, such as camera serial interfaces (CSIs) 514, 516, which are provided as examples. The Ethernet switch 508 is shown as being connected to PHY circuits 520, 522, 524. The PHY circuits 520, 522, 524 are connected to one or more cameras 526, one or more RADAR sensors 528, and one or more LIDAR sensors 530. In an embodiment, the PHY circuits 520, 522, 524 are implemented in the network switch 502 and/or in the Ethernet switch 508. In the example shown, the host controllers 512 are connected to one or more cameras 532 and one or more cameras 534 via each of the CSIs 514, 516. The connections between the Ethernet switch 508 and the cameras 526 and the sensors 528, 530 are Ethernet connections. Similarly, the connections between the host controllers 512 and the cameras 532, 534 are Ethernet connections.

Figure 6:
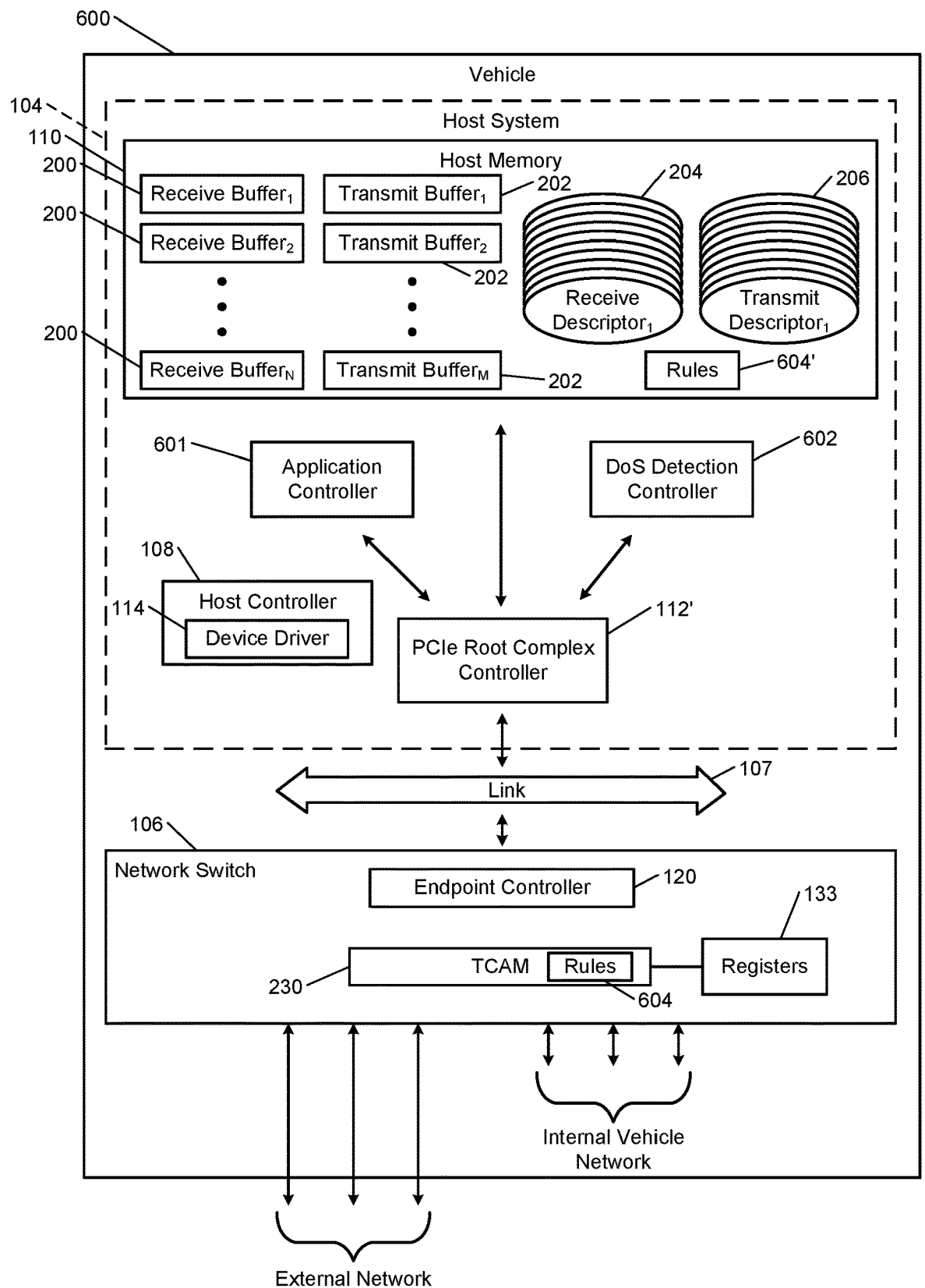
FIG. 6 is a functional block diagram of a peripheral component interconnect express implementation of the host system and network switch of FIG. 2 implemented within a vehicle where the host system includes an application controller and a denial of service detection controller in accordance with the present disclosure.

FIG. 6 shows a PCIe implementation of the host system 104 and network switch 106 of FIG. 2 implemented within a vehicle 600, where the host system 104 includes the host controller 108, the host memory 110, a PCIe root complex controller 112, an application controller 601 and a DoS detection controller 602. The host controller 108 includes the device driver 114. The application controller 601 executes one or more software applications and is connected to and/or communicates with the PCIe root complex controller 112 via a first channel. The application controller 601 and the PCIe root complex controller 112 have access to a first set of receive and transmit descriptors stored in the host memory 110. The DoS detection controller 602 is connected to and/or communicates with the PCIe root complex controller 112 via a second channel. In an embodiment, the first set of receive and transmit descriptors are configured by the application controller 601 and used by, for example, a DMA controller of the network switch, to transfer data (e.g., application data) as described above. The DoS detection controller 602 and the PCIe root complex controller 112 have access to a second set of receive and transmit descriptors stored in the host memory 110. The second set of receive and transmit descriptors are exclusive of the first set of receive and transmit descriptors. In an embodiment, the second set of receive and transmit descriptors are configured by the DoS detection controller 602 and used by, for example, a DMA controller of the network switch, to transfer data (e.g., control information) as described above. In one embodiment, the first and second channel refer to the receive and transmit descriptors included in the first and second sets of receive and transmit descriptors.

The DoS detection controller 602 sets and adjusts rules 604 and applies the configuration to the registers 133 to adjust under what conditions the frame and/or the connection is dropped. Changes to the configuration are done via register accesses. The controllers 601, 602 may be implemented in a same host controller as the device driver 114 or may be implemented in other host controllers and/or elsewhere in the host system 104. In one embodiment, the device driver 114 replaces and performs the operations described herein with respect to the DoS detection controller 602. In another embodiment, the device driver 114 provides an interface to the DoS detection controller 602 to assess the frames and a static Internet protocol (IP) routing table stored in the TCAM 230 for dynamically configuring IP routing and DoS attack prevention features. By having the DoS detection controller 602 and/or the device driver 114 assess frames and static IP routing table stored in the TCAM as described, the described data transfer system has enhanced robustness because this assessment is accomplished via a dedicated control bus (e.g., the control bus 121 of FIG. 2). The control bus 121 is minimally if at all affected by data traffic received from network devices external to the network switch 106 and received at ports of the network switch 106. Since the control bus 121 is used primarily for transfer of control information between the endpoint controller 120 and the DMA controllers 124, 126 and since the control bus 121 is isolated from the external ports of the Ethernet switch 132, data traffic between the Ethernet switch 132 and external network devices does not affect transfer of control information on the control bus 121.

The host memory 110 includes the buffers 200, 202 and the descriptors 204, 206. The network switch 106 communicates with the host system 104 via the link 107 and includes the endpoint controller 120, registers 133, and the TCAM 230. Some ports of the network switch 106 (e.g., some ports of an Ethernet switch within the network switch 106) are connected to network device external to the vehicle and are protected against an attack.

The TCAM 230 stores rules 604 and versions thereof. The TCAM 230, based on rules 604, (i) maintains or drops connections with devices external to the network switch 106 and/or the vehicle 600, and (ii) controls passage and dropping of frames. The rules 604 provide conditions based on which frames and/or a connection are to be dropped. The host memory 110 stores a version of the rules 604, which are accessed and modified by the DoS detection controller 602.

Figure 7:
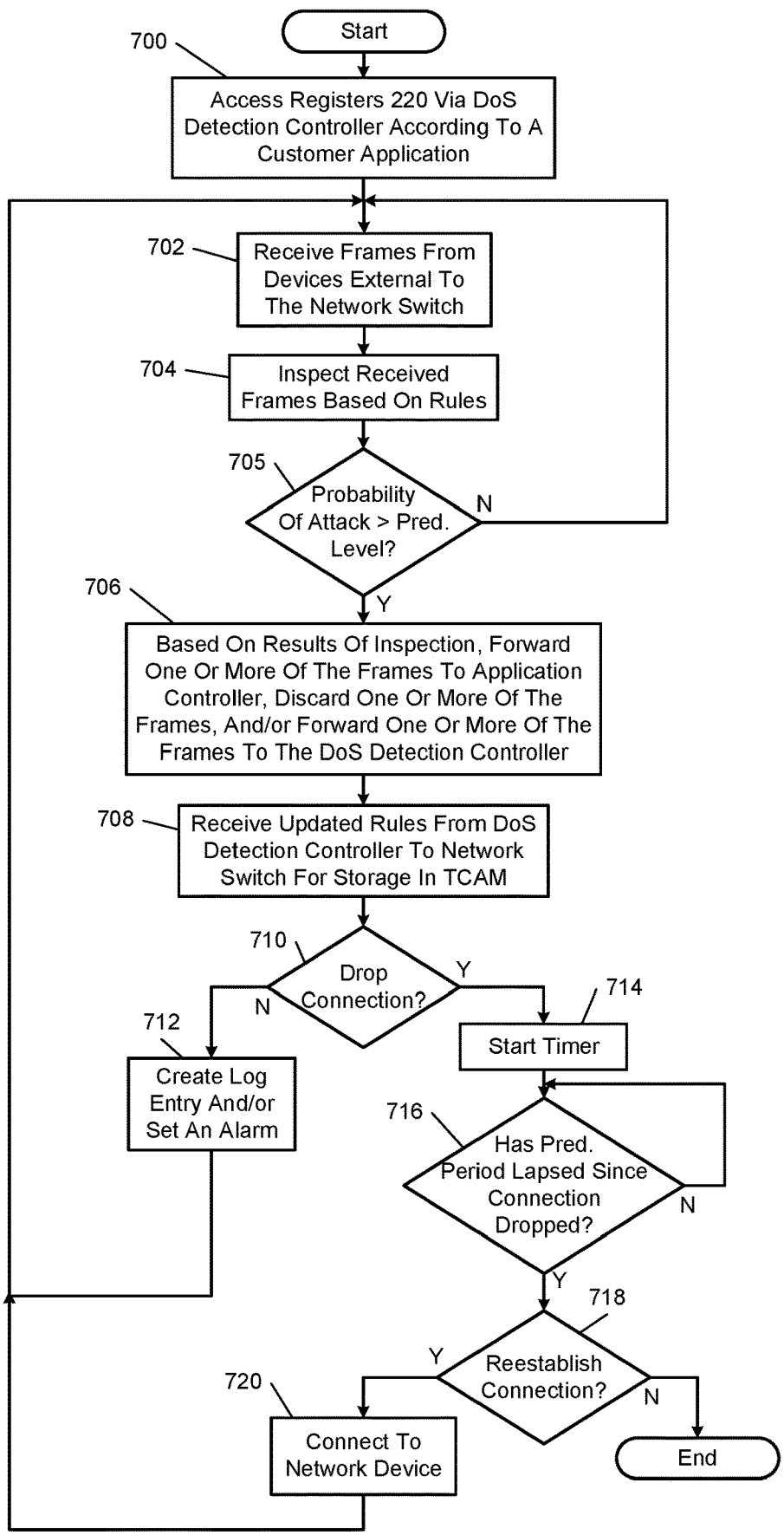
FIG. 7 illustrates an attack prevention method performed by a network switch in accordance with the present disclosure.

FIG. 7 shows an attack prevention method, which is primarily implemented by the TCAM 230. At 700, the DoS detection controller 602 accesses the registers 133 according to an application (e.g., a customer application) implemented by the application controller 601.

At 702, the TCAM controller 232 receives frames from source devices external to the network switch. The frames are received from one or more source devices in a network external to a vehicle and/or one or more frames from source devices in a network within the vehicle.

At 704, the TCAM controller 232 inspects one or more of the received frames as the frames are received. The TCAM controller 232 selects at least some of the received frames to inspect. This inspection is conducted based on the rules 604. At 705, the TCAM controller 232, based results of the inspection, determines a probability of an attack. If the probability is greater than a predetermined level, operation 706 is performed, otherwise operation 702 is performed. In one embodiment, the TCAM controller 232 calculates an IP checksum offload value. This is done to check integrity of a frame and determine whether the frame has an error or not. The IP checksum offload value is used to determine whether the frame is corrupt. As an example, a header of the frame is modified to include the IP checksum offload value.

At 706, the TCAM controller 232, based on results of the inspection, forwards one or more of the received frames to the application controller 601, discards one or more of the received frames, and/or forwards one or more of the received frames to the DoS detection controller 602. In one embodiment, operation 708 is performed subsequent to operation 706.

At 708, the TCAM controller 232 accesses updated rules from the DoS detection controller 602, which are stored in the register 133. The DoS detection controller 602 stores the rules in the registers 133. At 710, the TCAM controller 232 proceeds to operation 712 when a connection has been maintained and performs operation 714 when a connection has been dropped. In an embodiment, operations 700, 702, 704, 706, 708, 710, 712, 714, 716, 718, 720 are performed for each source device external to the network switch 106 and in a network internal to the vehicle or in a network external to the vehicle. The TCAM controller may perform multiple iterations of these operations in parallel. As a result and as an example, operation 712 can be performed for a first device while operation 714 is performed for a second device. The TCAM controller 232 creates a log and/or sets an alarm as described below for the first device while timing a lapsed period since a connection was dropped and determining whether to reestablish a connection with the second device.

At 712, the TCAM controller 232 creates a log entry and/or sets an alarm. A log is stored in the TCAM 230 and maintains a record of the frames received, sources of the frames, addresses of the sources, times and dates of when the frames were received. The log is for frames associated with a possible attack and/or for which a probability of an attack is greater than the predetermined level. In an embodiment, an alarm is generated to indicate frames have been received and a probability level of whether the frames are associated with an attack. As an example, the alarm includes a video signal indicated on a display of the vehicle, an audio alert, an alert signal transmitted to a mobile device within the vehicle, an alert signal transmitted to a network device (e.g., central monitoring station) external to the vehicle, and/or an alert signal transmitted to a diagnostic controller external to the vehicle.

At 714, the TCAM controller 232 starts a timer. In one embodiment, the timer is started when the frames associated with and/or having a high likelihood of being associated with an attack were received or inspected. In the embodiment shown, the timer is started when a connection associated with the frames is dropped. At 716, the TCAM controller 232 determines whether a predetermined period has lapsed since the timer was started. If the predetermined period has lapsed, operation 718 is performed.

At 718, the TCAM controller 232 determines whether to reestablish the dropped connection. This is determined based on the rules, the probability that an attack was experienced, the identification and/or location of the source device transmitting the frames, and/or other information indicating whether the frames were associated with an attack, such as received information indicating that the source device is not an attacker. At 720, the TCAM controller 232 reconnects to the source device that sent the frames previously determined to be possibly associated with an attack.

Figure 8:
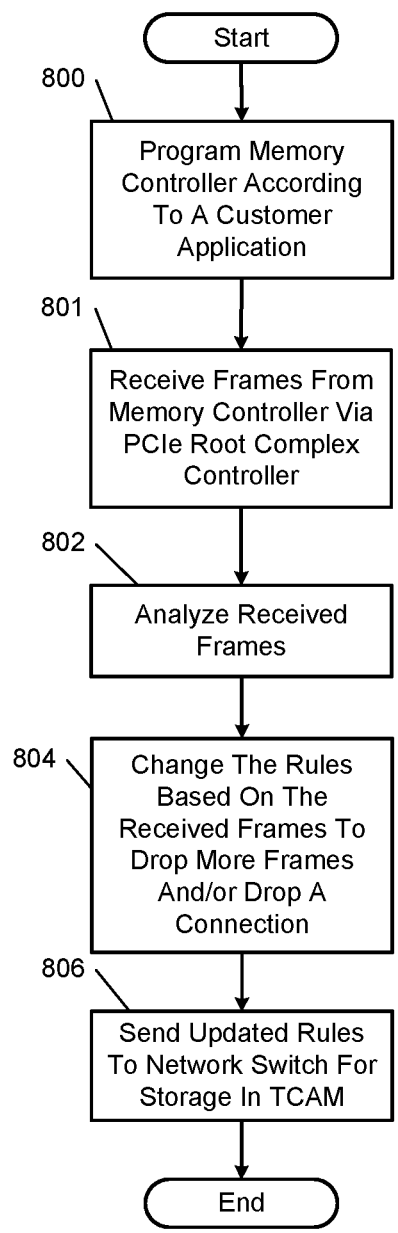
FIG. 8 illustrates a denial of service method performed by a denial of service detection controller of a host system and in accordance with the present disclosure.

FIG. 8 shows a denial of service method implemented by the DoS detection controller 602. At 800, the DoS detection controller 602 at startup programs the TCAM controller 232 according to an application (e.g., a customer application) implemented by the application controller 601.

At 801, the DoS detection controller 602 receives frames from the TCAM controller 232 via the PCIe root complex controller 112. At 802, the DoS detection controller 602 analyzes the received frames to determine whether the received frames are associated with an actual attack or there being a high probability of association with an attack.

At 804, the DoS detection controller 602 changes the rules 604 based on the received frames to drop more frames and/or a connection. In one embodiment, this occurs when the probability that the frames are associated with an attack is greater than a predetermined threshold. The determination of whether to drop the frames also or alternatively depends on the type of the frame received, information (e.g., IP checksum offload values) in headers of the frames, and/or the rules 604. At 806, the DoS detection controller 602 sends the updated rules 604 to the network switch 106 for storage in the TCAM 230 and use by the TCAM controller 232.

The above-described operations of FIGS. 5 and 7-8 are meant to be illustrative examples. The operations may be performed sequentially, synchronously, simultaneously, continuously, during overlapping time periods or in a different order depending upon the application. Also, any of the operations may not be performed or skipped depending on the implementation and/or sequence of events.

The above-described examples include network switches with endpoint controllers, which eliminate need for a network interface card between a root complex controller and a switch. The provided network switches consume minimal power and provide a device driver of a host system with control over an entire core of a network switch including control over endpoint controllers of the network switches, DMA controllers, MAC receivers and transmitters, TCAMs and corresponding registers. The examples include a host system with a DoS controller for detecting attacks and indirectly controlling operation of a TCAM located within a network switch to stop the attack. The TCAM is able to filter out frames associated with an attack and/or including errors. The filtering is able to occur "on-the-fly" as frames are received and inspected. This prevents a network device external to a vehicle from attacking a host system of the vehicle and controlling operation of the vehicle.

Spatial and functional relationships between elements (for example, between circuit elements) are described using various terms, including "connected," "engaged," "coupled," and "adjacent." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application and in some examples, including the definitions below, the term "controller" is interchangeable with the term "circuit." In some examples, the term "controller" refers to, is part of, or includes: an Application Specific Integrated Circuit (ASIC); other suitable hardware components that provide the described functionality; or a combination of some or all of the above, such as in a system-on-chip.

What is claimed is:

1. A network switch comprising:
a register;
a peripheral component interconnect express (PCIe) device connected to a host system separate from the network switch by a PCIe link and configured to
receive data and control information transmitted on the PCIe link, the data being transferred between a memory of the host system and a network device separate from the network switch and the host system, and the data not including information to configure the network switch, and
forward the control information to configure the network switch for independent access of the memory of the host system, the independent access being absent interaction with a host controller of the host system; and
a direct memory access controller configured to receive the control information from at least one of the register and the PCIE device, and based on the control information and without interaction with the host controller of the host system, to control transfer of the data between the memory of the host system and the network device.

2. The network switch of claim 1, wherein the direct memory access controller is configured to, without interaction with the host controller of the host system, i) instruct a root complex controller of the host system, based on the control inform n to access the data stored in at least one buffer of the memory of the host system, and ii) transmit the data to the network device.

3. The network switch of claim 1, wherein the PCIe device is configured to forward the control information on a control bus to at least one of the register and the direct memory access controller.

4. The network switch of claim 1, further comprising:
a data bus configured to transfer the data between the PCIe device and the direct memory access controller; and
a control bus configured to transfer the control information between the PCIe device and the register and between the PCIe device and the direct memory access controller.

5. The network switch of claim 4, wherein the control bus is separate the data bus.

6. The network switch of claim 1, further comprising a data bus configured to transfer the data between the PCIe device and the direct memory access controller,
wherein the PCIe device is configured to receive a descriptor generated by a device driver of the host system and transmitted from the host system to the network switch, to store the descriptor in the register, and to transfer the data between a root complex controller of the host system and the data bus, the descriptor identifying an address of a buffer in the memory of the host system.

7. The network switch of claim 1, wherein the direct memory access controller is configured to:
receive an address of a buffer of the memory of the host system from the PCIE device or the register;
receive a signal from a device driver of the host system granting independent access to the memory; and
based on the address and the signal and independently of the device driver, control transfer of the data between the memory of the host system and the network device.

8. The network switch of claim 1, wherein the control information comprises at least one of i) source addresses where the data is stored, ii) destination addresses where the data is to be delivered, iii) a source identifier identifying a device where the data is stored, iv) a destination identifier identifying a device where the data is to be delivered, v) types of frames included in the data, and vi) sizes of the frames included in the data.

9. The network switch of claim 1, further comprising:
a medium access control device configured to transfer the data to or from the direct memory access controller; and
an Ethernet switch configured to transfer the data between the medium access control device and the network device.

10. The network switch of claim 1, wherein the network device is a sensor, an actuator, a PCIe device, or an endpoint device.

11. The network switch of claim 1, wherein the direct memory access controller is configured to obtain, prior to transferring the data, access control of a buffer of the memory from a device driver of the host system and to generate, after transferring the data, an interrupt to return access control of the buffer to the device driver.

12. The network switch of claim 1, further comprising a controller configured to, receive a rule stored in the memory and, based on the rule, to inspect a frame received from the network device at the network switch and to either drop the frame or forward the frame to a device driver of the host system.

13. The network switch of claim 1, wherein the network switch is configured as a PCIe endpoint relative to the host system and configured by the host system using PCIe protocols and the PCIe link.

14. The network switch of claim 1, further comprising a data bus,
wherein the PCIe device is implemented as an endpoint controller and is configured to allow the network switch to operate as an endpoint device relative to the host system by communicating with a root complex controller of the host system and controlling operation of the network switch including reception of the control information and transfer of the data between the root complex controller and the data bus.

15. The network switch of claim 1, wherein the PCIe device is configured to 1) be perceived by the host system as a PCIe endpoint device, 2) control operation of the network switch, and 3) support communication in full-duplex mode over the PCIe link between the host system and the network switch.

16. The network switch of claim 1, further comprising a ternary content addressable memory controller configured to:

receive a rule from the host system;
inspect a frame received from the network device; and
based on the rule and inspection of the frame, prevent direct memory access of the memory of the host system.

17. The network switch of claim 1, further comprising a ternary content addressable memory controller configured to:
receive a rule from the host system;
inspect a frame received from the network device; and
based on the rule and inspection of the frame, instead of sending the frame to the memory of the host system, redirect the frame to one of a device driver, an application controller and a denial of service controller of the host system.

18. The network switch of claim 1, wherein the direct memory access controller is configured to receive an indication signal from the host controller of the host system, the indication signal indicating a grant of access to a buffer of the memory to the network switch and, based on the indication signal, access the buffer independently of the host controller of the host system from which the indication signal was received.

19. An in-vehicle communication network comprising:
the network switch of claim 1;
the memory;
the host controller separate from the network switch, implemented in the host system, and comprising a device driver; and
a root complex controller configured to provide the device driver and the direct memory access controller access to the memory.

20. The in-vehicle communication network of claim 19, wherein the network device is implemented as a sensor.

21. The in-vehicle communication network of claim 19, wherein:
the device driver is configured to transfer control of a buffer of the memory to the direct memory access controller; and
the direct memory access controller is configured to return control of the buffer hack to the device driver.

22. The in-vehicle communication network of claim 19, wherein the root complex controller is configured to control transfer of the control information between the device driver and the memory.

23. The in-vehicle communication network of claim 19, wherein the root complex controller and the PCIe device operate according to a PCIe protocol.

24. The in-vehicle communication network of claim 19, further comprising a denial of service controller configured to receive a frame from the network switch, to determine whether the frame is likely associated with an attack, to change a rule stored in the memory, and to send the changed rule to the network switch to drop another frame or a connection with the network device.

* * * * *